May 9, 1950     T. R. KOMLINE     2,506,646
SPRAY DRIER

Filed July 12, 1946     3 Sheets-Sheet 1

INVENTOR
THOMAS R. KOMLINE
BY
E. W. Marshall
ATTORNEY

May 9, 1950 T. R. KOMLINE 2,506,646
SPRAY DRIER
Filed July 12, 1946 3 Sheets-Sheet 2

INVENTOR
THOMAS R. KOMLINE
BY
E. W. Marshall
ATTORNEY

May 9, 1950 T. R. KOMLINE 2,506,646
SPRAY DRIER
Filed July 12, 1946 3 Sheets-Sheet 3
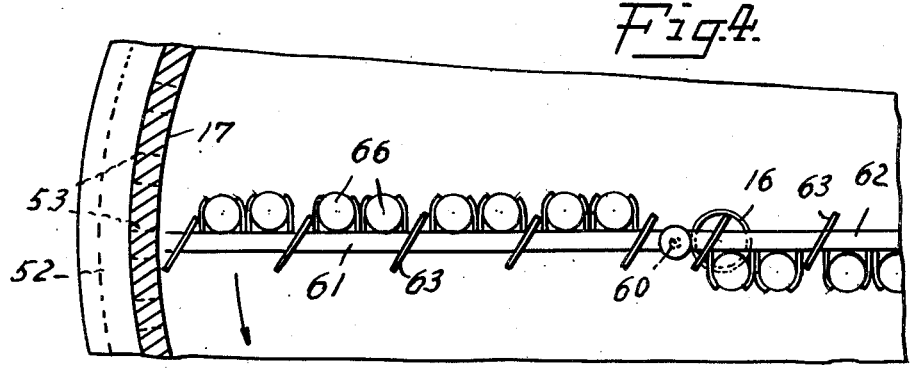
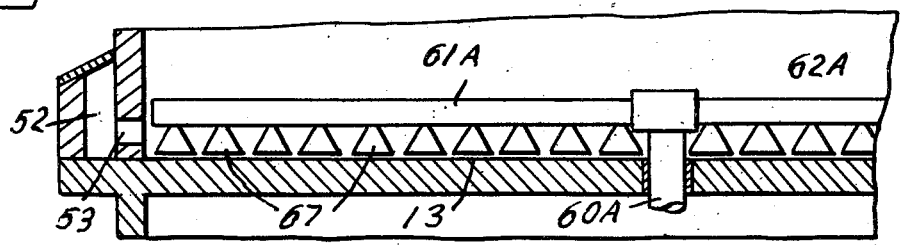
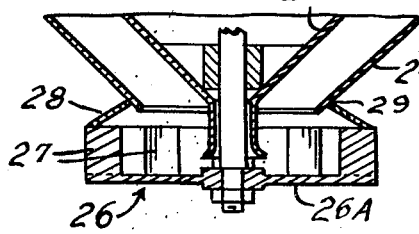
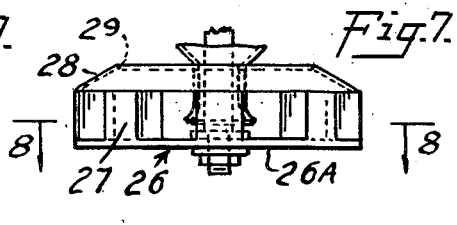
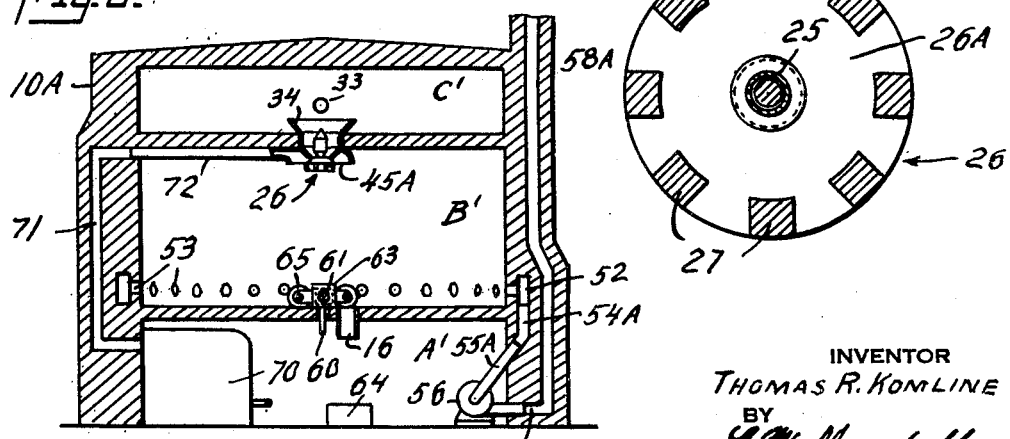
INVENTOR
THOMAS R. KOMLINE
BY
E. W. Marshall
ATTORNEY Patented May 9, 1950

2,506,646

UNITED STATES PATENT OFFICE 2,506,646

SPRAY DRIER

Thomas R. Komline, Glen Rock, N. J., assignor to Komline-Sanderson Engineering Corporation, Glen Rock, N. J., a corporation of New Jersey Application July 12, 1946, Serial No. 683,125

10 Claims. (Cl. 34—57)

This invention relates to an improved spray drier, and its object is to provide an apparatus for removing solid matter from a mixture or solution containing water or other liquids in a rapid and efficient manner. Sewage sludge, fresh cow manure and chemicals requiring in their processing operations, large evaporative capacity are examples of such mixtures.

Other objects are to provide an apparatus for the aforesaid purpose which occupies less space than such arrangements as have been used heretofore, and which requires a minimum amount of supervision.

According to my invention, the parts of the apparatus are within a self-contained structure, and are arranged in a novel manner to conserve space and to facilitate whatever supervision is required.

These and other objects of the invention will be set forth in the following specification, and its novel features defined in claims.

Referring to the drawings:

Fig. 4 is a plan view of a modification of some of the parts shown in Fig. 3;

Fig. 5 is a sectional elevation of a portion of the structure shown in Fig. 1, with a further modification of some of its parts;

Fig. 6 is a diagrammatic sectional elevation of a structure of modified form which also embodies certain feature of this invention;

Fig. 7 is an elevation on an enlarged scale of a centrifugal breaker and distributor which is shown in Figs. 1 and 6;

Fig. 8 is a sectional plan view of the device shown in Fig. 7, the section being taken on the line 8—8 of Fig. 7; and Fig. 9 is a sectional elevation of the device shown in Figs. 7 and 8.

Figure 1:
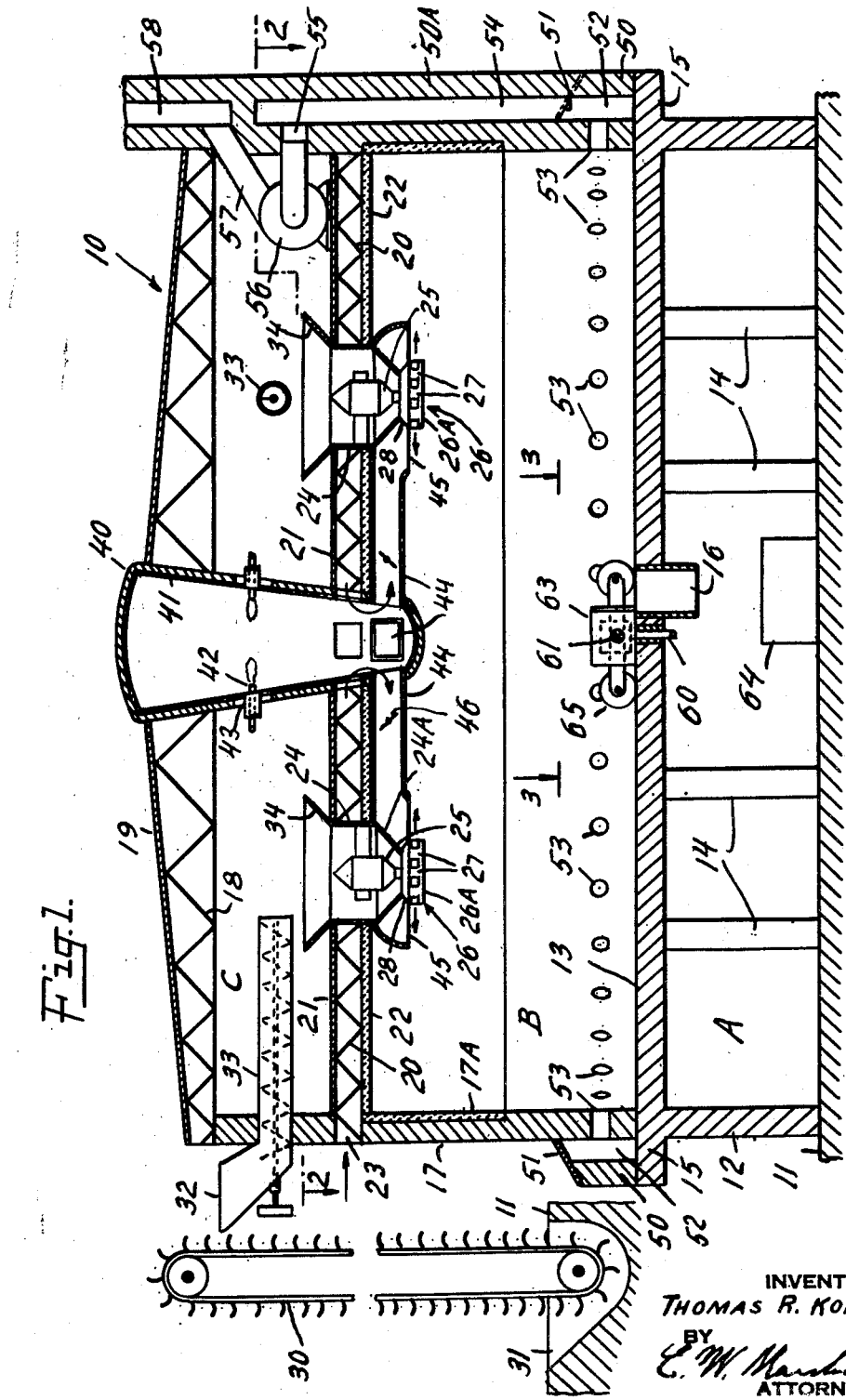
Fig. 1 is a sectional elevation, more or less diagrammatic, of an apparatus which is made according to and embodies this invention.

In the drawings, 10 designates a structure supported on a foundation 11 and comprises a substantially continuous lower wall 12, which supports a floor slab 13. The floor slab is also supported by columns 14 at points intermediate its periphery. A working space A with sufficient headroom to enable an operator to perform his functions comfortably is provided between the foundation 11 and the slab 13. The floor slab extends outwardly beyond the wall 12, as shown at 15, and its upper surface is shown as flat and horizontal. 16 is a discharge opening formed near the center of the slab 13. The parts thus described may be constructed advantageously of reinforced concrete.

17 is an upper wall supported on the slab 13. This upper wall may be alined with the lower wall, and both of these walls may be circular, as shown in the drawings. 18 is a truss supported on the top of the upper wall, over which truss is a roof 19.

Intermediate the slab 13 and the truss 18 is another truss 20, on the top of which is a floor 21, preferably of steel plate. A layer of heat insulation 22 is on the under side of the truss 20. The air space between the floor 21 and the layer 22 is open to the outside of the wall 17, as shown at 23 (Fig. 1).

A drying chamber B is formed between the wall 17 above the slab 13, and the covered truss 20 forms a closure for the upper end of this drying chamber. The wall of the drying chamber, or a part of it, may be covered with a refractory lining 17A. A working space C is provided within the upper wall 17 between the floor 21, and the truss 18.

Figure 2:
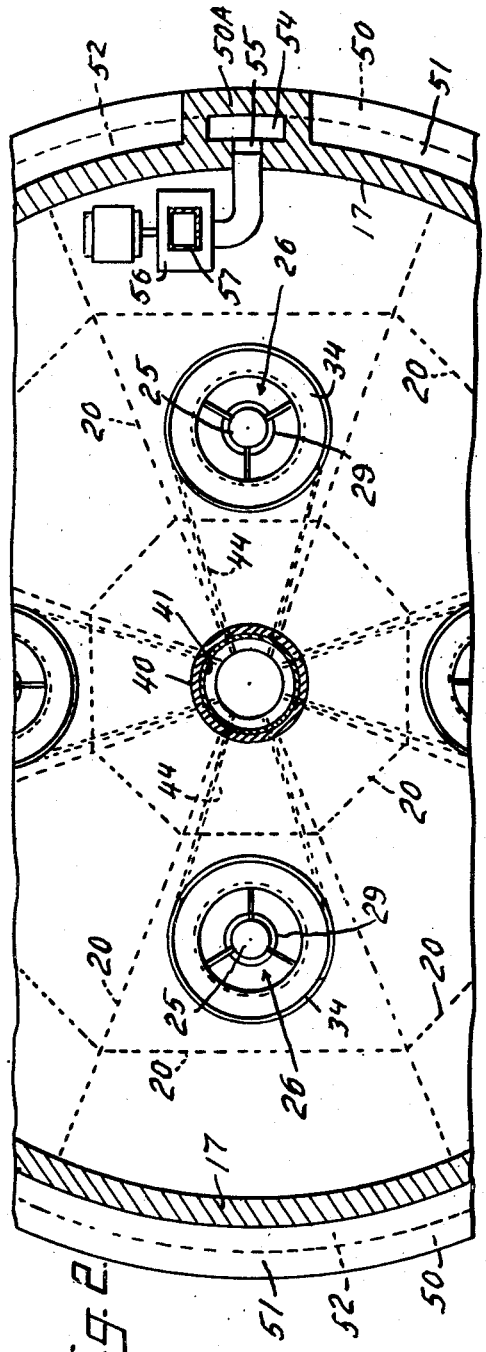
Fig. 2 is a partial sectional plan view of the apparatus shown in Fig. 1, the section being taken on the line 2—2 of the latter figure.

A plurality of angularly spaced openings are provided through the closure thus described, surrounded by cylindrical casings 24, which extend slightly into the chamber B. The lower of these casings converge as at 24A to form restricted discharge openings. These openings are equally spaced from the center of the chamber B and are angularly spaced from one another. In the specific form illustrated in Figs. 1 and 2, there are four of these openings. A cylindrical housing 25 within each of the casings encloses a motor, to the shaft of which is attached a centrifugal breaker and distributor 26. Annular spaces are left between the casings 24 and the housings 25, through which material to be dried is fed to the breakers and distributors. The material is led to these annular spaces by any convenient means, such, for example, as the mechanism shown in Fig. 1, which comprises an elevating conveyor 30 arranged to lift the material from a pit 31 in the foundation 11, and to discharge it into a receptacle 32, from which it is led by a screw conveyor 33 into the outwardly flared upper end 34 of the casing 24 and through the space between the casing 24 and the housing 25 into the centrifugal breaker and distributor.

The breakers and distributors themselves form no part of the present invention. I have shown them as of the type fully described and claimed in my copending application for patent Ser. No. 632,377, filed December 3, 1945. Briefly, each comprises a flat circular base plate 26A affixed to the shaft of a motor within the housing 25. A plurality of angularly spaced flights 27 extend upwardly from the periphery of the base plate with open spaces between them. 28 is a cover, which is inclined upwardly from the outer edges of the flights and is open at the top, as shown at 29. This construction is shown in Figs. 7, 8 and 9. The material is thrown outwardly from the breakers, which rotate at a high speed, in the form of finely divided particles.

40 is a furnace suspended from and supported by the truss 18 and extending into the center of the chamber B. The furnace is covered with a refractory lining 41. In it are fuel burners 42 surrounded by air-intake orifices 43. Tempering air from the space between the floor 21 and the layer 22 enters the lower part of the furnace 40 and escapes therefrom, together with the burned gases of combustion into conduits 44, which lead to circular discharge openings 45 surrounding the casings 24. These discharge openings are of a larger diameter than, and are above and in axial alinement with, the breakers and distributors. Adjustable dampers 46 are in the conduits 44.

A part of the structure 10 is an outer secondary wall 50 supported on the projecting part 15 of the slab 13, and surrounding the lower part of the upper wall 17. 51 is a suitable cover, which extends from the top of this outer wall 50 to the upper wall 17. These parts form an annular duct 52, which surrounds the lower part of the drying chamber B and communicates with the drying chamber through a series of annularly spaced ports 53 through the upper wall 17 near the upper surface of the slab 13, but spaced above it.

At least at one part of the periphery of the upper wall 17 the outer wall 50 is extended vertically as at 50A to form separated vertical ducts 54 and 58 in the structure. A transverse duct 55 leads to the intake of an exhaust fan 56 in the working space C. The outlet of the exhaust fan is connected by a conduit 57 with the flue 58, which extends upwardly above the roof 19.

The result of this arrangement is that hot air and the products of combustion discharged through the openings 45 are drawn downwardly across the discharge of the matter thrown outwardly from the breakers. The particles are deflected downwardly by these currents and become thoroughly intermixed with the hot gases. A heat exchange is effected thereby, which removes much of the moisture from the mixture. The chamber B is heated by the hot gases and the air which enters the furnace through the space between the floor 21 and the layer 22 becomes preheated and tempers the gases of combustion to the desired drying temperature. This has the additional advantage of cooling the floor 21. The partially dried particles of matter become thoroughly dried as they pass through the chamber B. When the breakers are all rotated in the same direction, they impart a swirling motion to the mixture in the chamber. The dried material settles on the floor formed by the upper surface of the slab 13, and the moisture separated from it by this operation and entrained in the hot gases passes out through the ports 53, the ducts 52, 54 and the fan 56 to the duct or flue 58.

A power-driven shaft 60 passes centrally through the slab 13. Arms 61, 62 extends from it radially to points near the cylindrical wall of the chamber B. Scrapers 63 on these arms contact the upper surface of the slab. They are set diagonally so that when the arms are moved in the direction of the arrow D (Fig. 3), they move the dried matter accumulated on the floor of the drying chamber to the opening 16, through which they are discharged onto a conveyor or receptacle indicated diagrammatically at 64 in Fig. 1.

Figure 3:
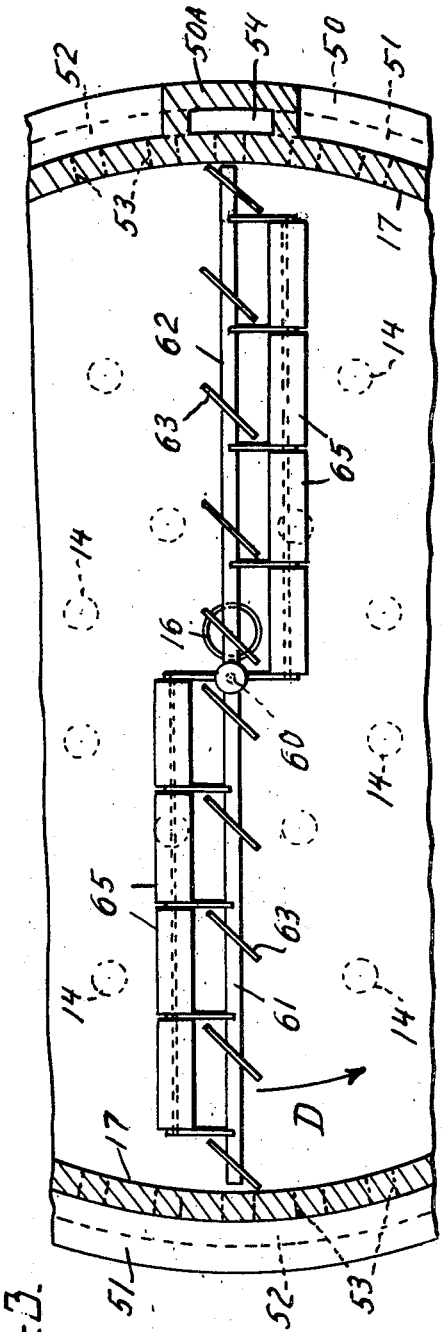
Fig. 3 is a partial sectional plan view of the same apparatus, the section in this figure being taken on the line 3—3 of Fig. 1.

When certain materials are dried in this apparatus, some of its particles deposited on the floor of the drying chamber may be pulverized by one or more mulling rolls 65 rotatably mounted on the arms 61, 62 on axes parallel with the arms. Such an arrangement is shown in Fig. 3, in which, instead of a single long mulling roll back of each of the arms, an alined series of shorter rolls is shown.

An alternate construction is shown in Fig. 4, in which balls 66 are used instead of rolls.

Another arrangement for removing the dried matter from the floor of the drying chamber is shown in Fig. 5. In this case a rotated suction pipe 60A extends through the center of the slab 13. From it, tubes 61A, 62A extend radially. 67 designates suction nozzles extending downwardly from the tubes 61A, 62A. Obviously, mullers may be used with this arrangement, if desired.

Some of the features disclosed in this application may be used in a structure such as that shown at 10A in Fig. 6. This structure is divided into three spaces, A', B', C', having cylindrical inner walls. In this case a single breaker and distributor 26 is installed centrally at the top of the drying chamber B'. The hot air and products of combustion are drawn through the ports 53 into the annular duct 52, which is connected by a duct 54A to an exhaust fan 56, which in this case is in the space A'. 55A is a conduit leading to the intake of the exhauster 56 which discharges through a conduit 57A into the flue 58A, which, as in the case previously described, is built into the structure 10A.

A furnace 70 in the space A' discharges hot gases through a duct 71 into the structure 10A and through a conduit 72 to a circular discharge opening 45A concentrically disposed in relation to the breaker. The operation of this apparatus is similar to that previously described, and no further explanation is necessary.

Various modifications in construction, mode of operation, method and use of an invention may and do occur to others, especially after benefiting from knowledge of such disclosure as that herein presented of the principles involved, but the invention itself is not confined to the present showing.

I claim:

1. A structure forming a drying chamber, a roof over the structure, transverse substantially horizontal closures at the upper and lower ends of said chamber to form a working space above the chamber and a working space below the chamber, a furnace over the chamber suspended from the roof, the upper closure being constructed with a plurality of openings disposed around the furnace for the admission into the upper part of the chamber of matter to be dried, means for admitting hot gas from the furnace into the chamber above the paths of the discharged matter and directing said gas across said paths to effect a heat interchange and to deflect the resultant mixture toward the lower closure, a duct surrounding the chamber, angularly spaced ports through the wall of the chamber near but spaced from the lower closure communicating with said surrounding duct, an exhaust fan connected with said surrounding duct to draw off the gas and entrained moisture and to discharge said gas and entrained moisture through a discharge duct, and means for moving dried material below the ports through the lower closure.

2. A structure forming a drying chamber, a roof over the structure, transverse substantially horizontal closures at the upper and lower ends of said chamber to form a working space above the chamber and a working space below the chamber, a furnace over the chamber suspended from the roof, the upper closure being constructed with a plurality of openings disposed around the furnace for the admission of matter to be dried, centrifugal breakers and distributors supported centrally in said openings adapted to receive the matter and to discharge said matter outwardly in the form of finely divided particles into the upper part of the chamber, means for admitting hot gas from the furnace into the chamber above the paths of the discharged matter and directing said gas across said paths to effect a heat interchange and to deflect the resultant mixture toward the lower closure, said structure being constructed to form a duct surrounding the chamber, angularly spaced ports through the wall of the chamber near but spaced from the lower closure communicating with said surrounding duct, an exhaust fan connected with said surrounding duct to draw off the gas and entrained moisture and to discharge said gas and entrained moisture through a discharge duct also formed in the structure, and means for moving dried material below the ports through the lower closure.

3. A structure forming a drying chamber, a trussed roof over the structure, transverse substantially horizontal closures at the upper and lower ends of said chamber to form a working space above the chamber and a working space below the chamber, a furnace over the chamber suspended from the trussed roof, said upper closure being constructed with a plurality of admission openings disposed around the furnace for the admission of matter to be dried, centrifugal breakers and distributors supported centrally in said admission openings adapted to receive the matter and to discharge said matter outwardly in the form of finely divided particles into the upper part of the chamber, a manifold below the upper closure in communication with the furnace, said manifold having radial conduits and circular discharge openings, said discharge openings being in axial alinement with and above the paths of the discharge matter to direct hot gas from the furnace into the chamber across said paths to de-effect a heat interchange and to deflect the resultant mixture toward the lower closure, ports through the wall of the chamber near but spaced from the lower closure, an exhaust fan connected with the ports to draw off the gas and the entrained moisture and to discharge the gas and the entrained moisture from the chamber through ducts formed in the structure, and means for removing dried material below the ports through the lower closure.

4. A structure forming a drying chamber, a trussed roof over the structure, a substantially horizontal trussed closure spaced from the trussed roof, a furnace in said space suspended from the trussed roof, a floor slab under the chamber, said trussed closure being constructed with a plurality of admission openings disposed around the furnace for the admission of matter to be dried, centrifugal breakers and distributors supported centrally in said admission openings adapted to receive the matter and to discharge said matter outwardly in the form of finely divided particles into the upper part of the chamber, a manifold below the upper closure in communication with the furnace, said horizontal trussed closure forming means for admitting tempering air to the manifold, said manifold having radial conduits and circular discharge openings, said discharge openings being in axial alinement with and above the paths of the discharged matter to direct hot gas from the furnace into the chamber across said paths to effect a heat interchange and to deflect the resultant mixture toward the lower closure, ports through the wall of the chamber near but spaced from the floor slab, an exhaust fan connected with the ports to draw off the gas and the entrained moisture and to discharge the gas and the entrained moisture from the chamber, and means for removing dried material below the ports from the floor slab.

5. A structure forming a drying chamber, a trussed roof over the structure, a substantially horizontal trussed closure spaced from the trussed roof, a furnace in said space suspended from the trussed roof, a floor slab under the chamber, said trussed closure being constructed with a plurality of admission openings disposed around the furnace for the admission of matter to be dried, centrifugal breakers and distributors supported centrally in said admission openings adapted to receive the matter and to discharge said matter outwardly in the form of finely divided particles into the upper part of the chamber, a manifold below the upper closure in communication with the furnace, said horizontal trussed closure forming means for admitting tempering air to the manifold, said manifold having radial conduits and circular discharge openings, adjustable dampers in said conduits, said discharge openings being in axial alinement with and above the paths of the discharged matter to direct hot gas from the furnace into the chamber across said paths to effect a heat interchange and to deflect the resultant mixture toward the lower closure, ports through the wall of the chamber near but spaced from the floor slab, an exhaust fan connected with the ports to draw off the gas and the entrained moisture and to discharge the gas and the entrained moisture from the chamber, and means for removing dried material below the ports from the floor slab.

6. A drying chamber, a closure over the top of the chamber, means for introducing material to be dried through said closure into the upper part of the chamber, a trussed roof structure above and spaced from said closure, and a furnace in said space suspended from the trussed roof structure having an opening under the closure through which hot gas is discharged into the chamber.

7. A drying chamber, a closure over the top of the chamber, means for introducing material to be dried through said closure into the upper part of the chamber, a trussed roof structure above and spaced from said closure, a furnace in said space suspended from the trussed roof structure having an opening under the closure through which hot gas is discharged into the chamber, means radially spaced around the furnace and angularly spaced from one another through which the material to be dried is introduced into the upper part of the chamber, and conduits for leading hot gas from the furnace to said material-introducing means.

8. A drying chamber, a hollow closure for the top of the chamber, means for introducing material to be dried into the upper part of the chamber, a furnace above the hollow closure arranged to discharge hot gas into the chamber, and ports for admitting tempering air from said hollow closure through the furnace to the chamber.

9. A base, a structure thereon forming a drying chamber, transverse substantially horizontal closures at the upper and lower ends of said chamber, a roof over and spaced from the closure at the upper end of the chamber to form an upper working space, means for supporting the closure at the lower end of the chamber in a position spaced from the base to form a lower working space, the upper closure being constructed with an opening for the admission of matter to be dried, the lower closure being constructed with a discharge opening, a centrifugal breaker and distributor supported centrally in the opening in the upper closure arranged to receive the matter and to discharge said matter outwardly in the form of finely divided particles into the upper part of the chamber, a conduit having a circular discharge opening above and in axial alignment with the breaker and distributor, a furnace arranged to discharge hot gas through the conduit into the chamber above the path of the discharged matter, across said path to effect heat interchange and to deflect the resultant mixture toward the lower closure, ports through the wall of the chamber near but spaced from the lower closure, an exhaust fan connected with the ports to draw off the gas and entrained moisture, a duct connected with the fan to receive and discharge the gas and entrained moisture, and means for moving dried material on the lower closure below said ports through the discharge opening in the lower closure.

10. A base, a structure thereon forming a drying chamber, transverse substantially horizontal closures at the upper and lower ends of said chamber, a roof over and spaced from the closure at the upper end of the chamber to form an upper working space, means for supporting the closure at the lower end of the chamber in a position spaced from the base to form a lower working space, the upper closure being constructed with an opening for the admission of matter to be dried, the lower closure being constructed with a discharge opening, a centrifugal breaker and distributor supported centrally in the opening in the upper closure arranged to receive the matter and to discharge said matter outwardly in the form of finely divided particles into the upper part of the chamber, a conduit having a circular discharge opening above and in axial alinement with the breaker and distributor, a furnace in the lower working space, a duct interconnecting the furnace and the conduit whereby hot gas from the furnace is admitted to the chamber above the path of the discharged matter, across said path to effect heat interchange and to deflect the resultant mixture toward the lower closure, ports through the wall of the chamber near but spaced from the lower closure, an exhaust fan in the lower working space connected with the ports to draw off the gas and entrained moisture, a duct connected with the fan to receive and discharge the gas and entrained moisture, and means for moving dried material on the lower closure below said ports through the discharge opening in the lower closure.

THOMAS R. KOMLINE.

REFERENCES CITED

The following references are of record in the file of this patent:

UNITED STATES PATENTS

| Number | Name | Date |
|---|---|---|
| 532,089 | Overton | Jan. 8, 1895 |
| 784,854 | Grace | Mar. 14, 1905 |
| 999,972 | Ekenberg | Aug. 8, 1911 |
| 1,428,526 | Bradley | Sept. 12, 1922 |
| 1,546,987 | MacLachlan | July 21, 1925 |
| 1,639,967 | Reader | Aug. 23, 1927 |
| 1,782,822 | Hechenbleckner | Nov. 25, 1930 |
| 1,805,659 | Fowler et al. | May 19, 1931 |
| 1,862,751 | Ingraham | June 14, 1932 |
| 1,989,406 | Doolittle | Jan. 29, 1935 |
| 2,146,051 | Black | Feb. 7, 1939 |

FOREIGN PATENTS

| Number | Country | Date |
|---|---|---|
| 278,263 | Great Britain | Oct. 6, 1927 |
| 618,105 | Germany | Sept. 2, 1935 |
| 679,893 | France | Jan. 14, 1930 |